(12) United States Patent
Raviv et al.

(10) Patent No.: US 10,038,672 B1
(45) Date of Patent: Jul. 31, 2018

(54) VIRTUAL PRIVATE NETWORK SESSIONS GENERATION

(71) Applicant: EMC Corporation, Hopkinton, MA (US)

(72) Inventors: Kineret Raviv, Hertzliya (IL); Carmit Sahar, Tel Aviv (IL); Eyal Kolman, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 242 days.

(21) Appl. No.: 15/083,956

(22) Filed: Mar. 29, 2016

(51) Int. Cl.
  *H04L 29/06* (2006.01)
  *G06F 3/0484* (2013.01)
  *H04L 12/26* (2006.01)

(52) U.S. Cl.
  CPC ........ *H04L 63/0272* (2013.01); *G06F 3/0484* (2013.01); *H04L 43/16* (2013.01)

(58) Field of Classification Search
  CPC .... H04L 63/0272; H04L 43/16; G06F 3/0484
  See application file for complete search history.

(56) References Cited

U.S. PATENT DOCUMENTS

| 7,058,973 B1* | 6/2006 | Sultan | H04L 29/12009 709/217 |
| 7,756,072 B1* | 7/2010 | Fenner | H04L 43/0817 370/256 |
| 9,635,015 B1* | 4/2017 | Panayotopoulos | H04L 63/083 |
| 2002/0099806 A1* | 7/2002 | Balsamo | H04L 63/06 709/223 |
| 2004/0177276 A1* | 9/2004 | MacKinnon | H04L 63/0263 726/5 |
| 2005/0143166 A1* | 6/2005 | Walker | G07F 17/3244 463/25 |
| 2006/0120374 A1* | 6/2006 | Yoshimoto | H04L 12/2856 370/392 |
| 2007/0280247 A1 | 12/2007 | Mera et al. | |
| 2008/0034057 A1* | 2/2008 | Kumar | H04L 12/4641 709/217 |
| 2008/0126478 A1* | 5/2008 | Ferguson | G06F 19/321 709/203 |
| 2009/0037594 A1* | 2/2009 | Sever | E21B 47/024 709/230 |
| 2010/0071043 A1* | 3/2010 | Babula | H04L 63/0272 726/7 |
| 2014/0379938 A1* | 12/2014 | Bosch | H04L 47/125 709/242 |

(Continued)

*Primary Examiner* — Sarah Su
(74) *Attorney, Agent, or Firm* — BainwoodHuang (57) ABSTRACT

A system for generating virtual private network (VPN) sessions from VPN server log messages uses and displays a VPN sessions table in which each row contains attributes of a corresponding VPN session. Processing of a log message causes a session to be generated when there is no ACTIVE session in the table for a username extracted from a log message. A time extracted from the log message is stored as the session start time and as a temporary end time associated with the session. If a gap between a temporary end time and a time extracted from a log message for the associated ACTIVE session is less than a threshold amount, the temporary end time is set to the extracted time. If the gap is equal to or exceeds the threshold, the status of the session is changed from ACTIVE to CLOSED, and a new ACTIVE session is generated.

15 Claims, 4 Drawing Sheets

(56) References Cited

U.S. PATENT DOCUMENTS

| | | |
|---|---|---|
| 2015/0254158 A1 | 9/2015 | Puri et al. |
| 2016/0036870 A1* | 2/2016 | Matsui ............... H04L 65/1086 |
| | | 709/227 |
| 2016/0050224 A1 | 2/2016 | Ricafort et al. |
| 2016/0277971 A1* | 9/2016 | Hamdi ................. H04L 45/306 |
| 2017/0147471 A1* | 5/2017 | Shadi ................. G06F 11/3624 |
| 2017/0374111 A1* | 12/2017 | Hinohara ............ H04L 65/1069 |

* cited by examiner

VPN SESSIONS TABLE 400

| USERNAME | START TIME | END TIME | SOURCE IP ADDRESS | VPN SERVER IP ADDRESS | CURRENT STATUS |
|---|---|---|---|---|---|
| uemgpk | 10/5/2015 14:54 | 10/5/2015 14:54 | 10.253.24.155 | 10.250.31.87 | FAILED |
| plqaxf | 10/1/2015 0:05 | 10/1/2015 1:34 | 189.55.241.113 | 10.250.31.100 | CLOSED |
| votrdy | 10/1/2015 21:17 | 10/1/2015 21:19 | 97.88.243.19 | 10.250.31.86 | CLOSED |
| tkghcs | 10/1/2015 21:24 | 10/1/2015 21:59 | 68.53.4.116 | 10.250.31.87 | CLOSED |
| xabuax | 10/1/2015 15:03 | 10/1/2015 20:59 | 74.120.68.249 | 10.250.31.90 | CLOSED |
| fukeau | 10/5/2015 14:55 | | 68.53.4.116 | 10.250.31.87 | ACTIVE |
| tyrgqy | 10/6/2015 13:20 | | 96.230.216.18 | 10.105.0.86 | ACTIVE |

GENERATED VPN SESSIONS 402

Fig. 4

VIRTUAL PRIVATE NETWORK SESSIONS GENERATION

BACKGROUND

As it is generally known, a Virtual Private Network (VPN) extends a private network, such as an intranet, across a public network, such as the Internet. VPNs enable users to send and receive data across public networks as if their computing devices were directly connected to the private network, and thus benefit from the functionality, security and management policies of the private network. A VPN user establishes a secure (e.g. encrypted) VPN connection across the public network by logging in to a VPN server. The user can then securely access the resources available on the private network through the VPN connection, until they subsequently log out.

VPN connections are inherent weak points for enterprise security, since they allow users from outside the enterprise to access enterprise resources connected to an internal, secured network. Accordingly, advanced risk-based security systems have attempted to focus their operations and resources on VPN connections.

SUMMARY

Raw data regarding VPN connections is available from VPN servers in the form of log messages. VPN server log messages represent messages passed between a user device and the VPN server while the user of the device i) establishes a VPN connection by logging in, ii) accesses resources on the private network through the VPN connection, and iii) logs out to close the VPN. Due to the large number of individual log messages that may be generated for a VPN connection, the raw data contained in a VPN server log may be voluminous, and difficult for security analysts to use for purposes of identifying suspicious network activity. A more useful construct for analyzing VPN connections is a "VPN session", which represents the activity over a VPN connection during the time between when a user logs in to establish a VPN, and when they subsequently log out to close the VPN.

Previous technologies have attempted to generate VPN sessions using raw data from VPN server logs, but have exhibited significant shortcomings. Specifically, previous systems have relied on the meanings of specific message IDs contained in VPN server log messages, such as message IDs for Successful Login, Failed Login, Logoff, etc. By identifying these specific message IDs in individual log messages, previous systems determined when a user was logging in to establish a VPN connection, when a login attempt failed, when a user was logging out to close a VPN connection, etc. Unfortunately, message ID values and their meanings vary between different VPN service providers. Accordingly, adding a VPN server from a new VPN service provider to a set of enterprise systems using previous technologies may require significant system modifications to handle the messages IDs specific to the new VPN service provider. Additionally, individual VPN service providers may at times change the message IDs and/or meanings of specific message IDs contained in the log messages generated by their VPN servers. Such changes may cause a security system that relies on the meanings of specific message IDs to fail in accurately generating VPN sessions.

To address these and other shortcomings of previous technologies, a new technical solution is disclosed for generating virtual private network (VPN) sessions from log messages received from one or more VPN servers. In the disclosed system, log messages are received from one or more VPN servers. Each of the received log messages was generated by the VPN server it was received from, while that VPN server provided a VPN connection to a user device. The disclosed system processes each one of the received log messages using a VPN sessions table that has multiple rows. Each row in the VPN sessions table represents a corresponding VPN session and contains attributes of the corresponding session, such as i) the username of the user who logged in to establish the VPN connection for the session (USERNAME), ii) a start time of the session (START TIME), iii) a current status of the session (CURRENT STATUS), equal to one of ACTIVE, CLOSED or FAILED, iii) an end time of the session (END TIME), iv) a source IP address that is the IP address of the user device that was used to establish the VPN connection for the session (SOURCE IP ADDRESS), and/or v) a VPN server IP address that is the IP address of the VPN server that was used to establish the VPN connection for the session (VPN SERVER IP ADDRESS). The disclosed system processes each one of the log messages it receives using the VPN sessions table by extracting a username and message time from the log message, and then determining whether the VPN sessions table currently includes a row that contains both i) a username matching the username extracted from the log message, and ii) a current status of ACTIVE. In response to determining that the VPN sessions table does not currently include a row that contains both i) a username matching the username extracted from the log message, and ii) a current status of ACTIVE, the disclosed system generates a new VPN session by adding a new row to the VPN sessions table. The new row contains i) a username matching the username extracted from the log message, ii) a session start time equal to the message time extracted from the log message, and iii) a current status of ACTIVE. Also while generating a new VPN session, the disclosed system sets a temporary end time corresponding to the new row to the message time extracted from the log message that caused the new VPN session to be generated. The temporary end time corresponding to the new row is stored within a set of temporary end times. The set of temporary end times includes a temporary end time for each row in the VPN sessions table that contains a current status of ACTIVE. The disclosed system may operate to display the VPN sessions table in a security analysis graphical user interface, in order to aid a security analyst user in identifying suspicious network activity that may be indicated by the attributes of the generated VPN sessions contained in the VPN sessions table.

In another aspect of the disclosed system, processing the received log messages may further include, in response to determining that the VPN sessions table currently includes a row that contains both i) a username matching the username extracted from a log message, and ii) a current status of ACTIVE, calculating a time gap between the message time extracted from the log message and the temporary end time corresponding to that row, comparing the calculated time gap to an inactivity threshold, and, in response to the calculated time gap being less than the inactivity threshold, updating the temporary end time corresponding to the row to the message time extracted from the log message.

In another aspect of the disclosed system, each row in the VPN sessions table may further contain a session end time attribute, and processing the received log messages may further include, in response to determining that the VPN sessions table currently includes a row that contains both i) a username matching the username extracted from a log message, and ii) a current status of ACTIVE, calculating a time gap between the message time extracted from the log message and the temporary end time corresponding to that row, comparing the calculated time gap to the inactivity threshold, and, in response to the calculated time gap being greater than or equal to the inactivity threshold, closing the session by setting the session end time in the row to the temporary end time corresponding to the row and updating the current status in the row to CLOSED.

In another aspect of the disclosed system, processing one of the received log messages may further include, in response to a calculated time gap being greater than or equal to the inactivity threshold, generating a new VPN session by adding a new row to the VPN sessions table, where the new row contains i) a username matching the username extracted from the log message, ii) a session start time equal to the message time extracted from the log message, and iii) a current status of ACTIVE, and by also setting a temporary end time corresponding to the new row to the message time extracted from the log message.

In another aspect of the disclosed system, processing the received log messages may further include, in response to determining that the time gap between the messages time extracted from a log message and the temporary end time corresponding to an ACTIVE row is greater than or equal to the inactivity threshold, the disclosed system sets the session end time in the row to the temporary end time corresponding to the row, calculates a session duration equal to the time period between the session start time and session end time contained in the row, and compares the session duration to a minimum session threshold. In response to the session duration being less than the minimum session threshold, the disclosed system sets the current status in the row to FAILED.

In another aspect of the disclosed system, processing the received log messages may further include extracting, from each log message, a source IP (Internet Protocol) address that is an IP address of a device used to establish a VPN connection associated with the log message, and setting the source IP address in each row of the VPN sessions table to a source IP address equal to the IP address extracted from the log message that caused the row to be added to the VPN sessions table.

And in another aspect of the disclosed system, each row in the VPN sessions table may further contain a VPN server IP address equal to the IP address of the VPN server from which the log message that caused the row to be added to the VPN sessions table was received.

Embodiments of the disclosed technology may solve significant problems inherent in previous technologies. Specifically, the disclosed technology enables effective generation of VPN sessions from raw data in logs received from VPN servers. The VPN sessions generated using the disclosed system are more useful and understandable than the log messages from which they are generated, and may be presented to a user in a VPN sessions table, e.g. within a security analysis graphical user interface. The VPN session attributes displayed in the VPN sessions table enable efficient identification of suspicious VPN sessions for further investigation.

Additionally, the disclosed system generates VPN sessions without using specific message IDs contained in the VPN server log messages. Accordingly, the disclosed system is not adversely impacted by the use of different messages IDs by different VPN service providers, and/or by changes to message IDs used by individual VPN service providers.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that such embodiments are provided only by way of example and to illustrate various features and principles of the invention, and that the invention itself is broader than the specific examples of embodiments disclosed herein.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
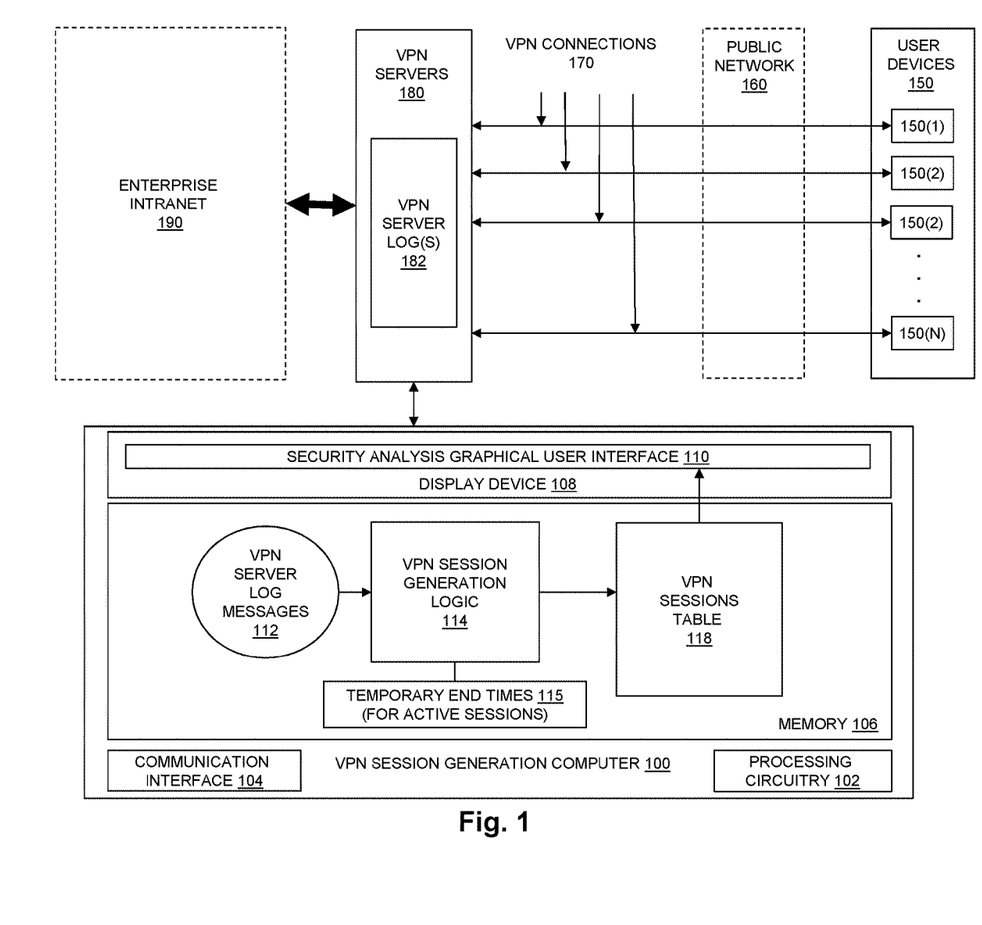
FIG. 1 is a block diagram showing an example of components in an illustrative embodiment of the disclosed system in a possible operational environment.

FIG. 1 is a block diagram showing an example of components in an illustrative embodiment of the disclosed system in an operational environment. As shown in FIG. 1, users of User Devices 150 establish VPN Connections 170 between User Devices 150 and one or more VPN Servers 180 over a Public Network 160. The VPN Connections 170 enable users of User Devices 150 to securely access Enterprise Intranet 190 on User Devices 150, as if User Devices 150 were directly connected to Enterprise Intranet 190. Messages conveyed over VPN Connections 170 may be encrypted to provide data security between User Devices 150 and VPN Servers 180. Public Network 160 may be made up of any specific unsecured network or networks, such as the Internet. Enterprise Intranet 190 may consist of or include any specific type of secure communication network, e.g. based on TCP/IP protocols, belonging to an organization, such as a corporation, and accessible only by the organization's members, employees, or others with authorization. Enterprise Intranet 190 may, for example, further include a firewall that prevents unauthorized access to Enterprise Intranet 190.

User Devices 150 are shown as devices 150(1) through 150(N), and may each consist of or include any specific type of computerized user device, such as a desktop computer, laptop computer, tablet computer, smartphone, personal digital assistant, etc. VPN Servers 180 may consist of or include one or more physical server computer systems, or alternatively one or more virtual private servers (VPSs), such as one or more cloud servers or the like, executing VPN service software.

In order to establish each one of VPN Connections 170, a user of one of User Devices 150 logs in to one of VPN Servers 180 by providing a username and password. For example, a user of User Device 150(1) logs establishes one of VPN Connections 170 by entering their username and password to User Device 150(1). The username and password are passed to one of VPN Servers 180, which authenticates the user based on the username and password. In response to authenticating the user, the VPN server then establishes one of the VPN Connections 170, i.e. between User Device 150(1) and the VPN server. The user of User Device 150(1) then uses the established VPN connection (one of VPN Connections 170) to access Enterprise Intranet 190, until the user logs out, causing that VPN connection to be closed.

While providing the VPN Connections 170, VPN Servers 180 generate log messages that are stored in VPN Server Logs 182. Each individual VPN server in VPN Servers 180 generates its own separate log. The log generated by an individual VPN server contains log messages representing and/or corresponding to individual messages passed between a user device and that VPN server, across one or more of VPN Connections 170 provided by that server. For example, log messages are generated and stored in a log for a specific VPN server in VPN Servers 180 for messages conveyed i) while a user establishes a VPN connection from their user device to the VPN server by logging in to the VPN server, ii) while the user subsequently uses the established VPN connection to access Enterprise Intranet 190, and iii) while the user logs out or otherwise causes the VPN connection to be closed. Each one of the VPN Servers 180 that generates a log may have its own IP address.

As further shown in FIG. 1, VPN Session Generation Computer 100 is communicably connected to each one of VPN Servers 180. For example, VPN Session Generation Computer 100 may be communicably connected to VPN Servers 180 through Enterprise Intranet 190. VPN Session Generation Computer 100 is shown including Processing Circuitry 102, Communication Interface 104, Memory 106, and Display Device 108. Processing Circuitry 102 may, for example, include or consist of one or more microprocessors or the like. Communication Interface 104 may, for example, include or consist of one or more network interface cards (NICs) or the like. Memory 106 may include or consist of any specific type of volatile or non-volatile semiconductor memory or the like that is operable to store programs (e.g. sequences of instructions) and/or data (e.g. program state information, input data, output data, etc.) for use in VPN Session Generation Computer 100. Display Device 108 may include or consist of any specific type of output device operable to present information in visual form, such as a computer monitor or other type of electronic visual display.

VPN Session Generation Computer 100 may consist of or include any specific type of computer or computer system, including but not limited to a server, desktop, laptop or tablet computer, or alternatively as one or more virtual private servers (VPSs), such as one or more cloud servers or the like.

Memory 106 of VPN Session Generation Computer 100 stores program code for execution on the Processing Circuitry 102, shown in the example of FIG. 1 by VPN Session Generation Logic 114.

Memory 106 further stores a VPN Sessions Table 118 that includes multiple rows. Each row in VPN Sessions Table 118 represents a corresponding VPN session that was generated by VPN Session Generation Logic 114. VPN Session Generation Logic 114 generates VPN sessions from VPN Server Log Messages 112 by adding new rows to VPN Sessions Table 118. Each row in VPN Sessions Table 118 contains attributes of the corresponding VPN session. The attributes contained in each row of the VPN Sessions Table 118 may include session attributes such as, for example, i) the username of the user who logged in to establish the VPN connection for the session, ii) a start time of the session, iii) a current status of the session, equal for example to one of ACTIVE, CLOSED or FAILED, iii) an end time of the session, iv) a source IP address that is the IP address of the user device that was used to establish the VPN connection for the session, and/or v) a VPN server IP address that is the IP address of the VPN server that was used to establish the VPN connection for the session.

Memory 106 further stores a set of Temporary End Times 115. Temporary End Times 115 includes a temporary end time for each row in VPN Sessions Table 118 that has a current status of ACTIVE.

During operation of the embodiment shown in FIG. 1, the log messages contained in VPN Server Logs 182 are conveyed to VPN Session Generation Computer 100, e.g. VPN server logs are periodically transmitted to VPN Session Generation Computer 100 over Enterprise Intranet 190). The VPN Server Logs 182 are shown after receipt by VPN Session Generation Computer 100 by VPN Server Log Messages 112.

Figure 2:
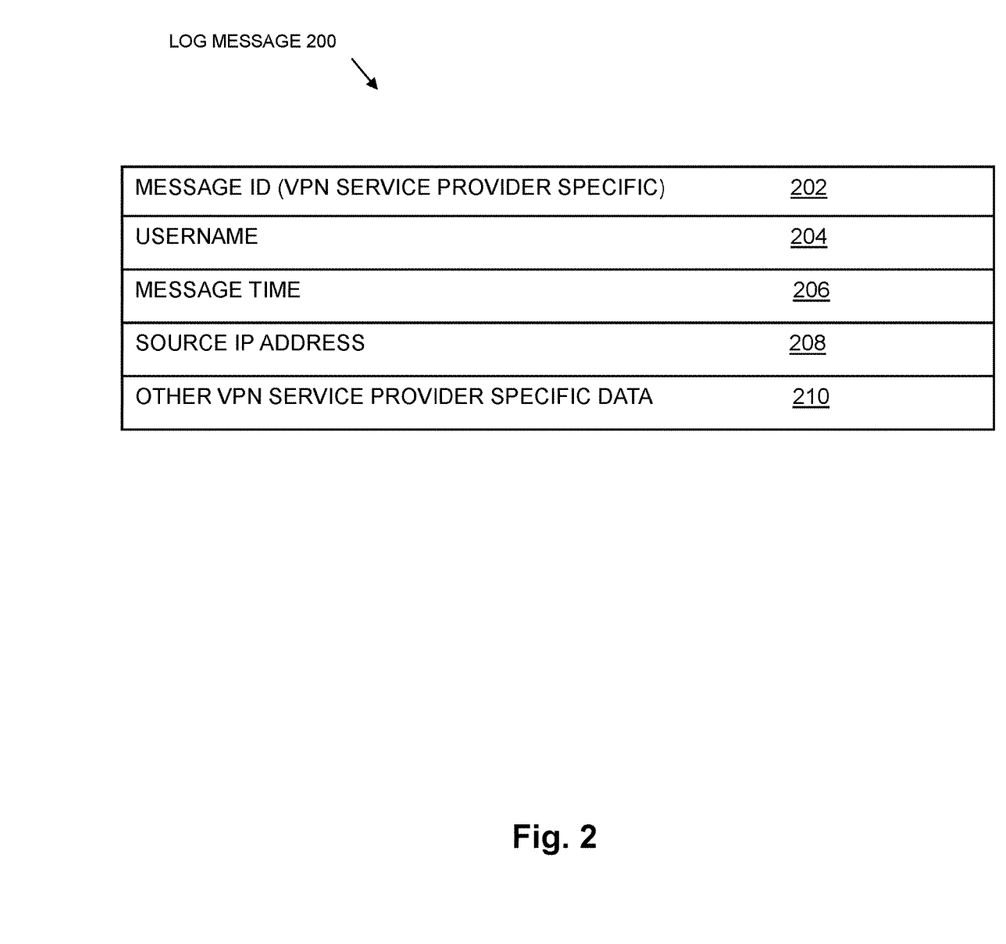
FIG. 2 is a block diagram showing a simplified example of elements in a VPN server log message.

A simplified example of elements in one of the log messages in VPN Server Log Messages 112 is shown by Log Message 200 in FIG. 2. Log Message 200 may, for example, be made up of a text string.

As shown in FIG. 2, Log Message 200 may include a Message ID 202. Message ID 202 may indicate the type of message or event represented by Log Message 200. Advantageously, the disclosed system does not require understanding the meaning of any specific value of Message ID 202, since the values of Message ID 202 have meanings that may be defined by individual VPN service providers, and since the meanings of specific values of Message ID 202 may change at the discretion of the individual VPN service providers that define them.

Log Message 200 further includes a Username 204. The Username 204 contains or otherwise indicates a username for the Log Message 200. For example, User Name 204 may be indicated by or include a predetermined text sub-string or tag equal to "USERNAME=" or the like, followed by a text sub-string that is the username for Log Message 200. The username for Log Message 200 may, for example, be a username provided by the user who logged in to the VPN server (e.g. one of VPN Servers 180) that generated Log Message 200, in order to establish a VPN connection (e.g. one of VPN Connections 170) between the user's user device (e.g. one of User Devices 150) and that VPN server.

Log Message 200 further includes a Message Time 206, which contains or otherwise indicates a time at which Log Message 200 was originally generated by one of VPN Servers 180 and added to one of the logs in VPN Server Logs 182.

Log Message 200 further includes a Source IP Address 208, which is the IP address of the user device with which a user established a VPN connection (e.g. one of VPN Connections 170) between the user device and the VPN server (e.g. one of VPN Connections 170) that generated Log Message 200.

Log Message 200 may further include various data, including for example Other VPN Service Provider Specific Data 210, which is not relied on or required to be used by the disclosed technology for generating VPN sessions.

Figure 3:
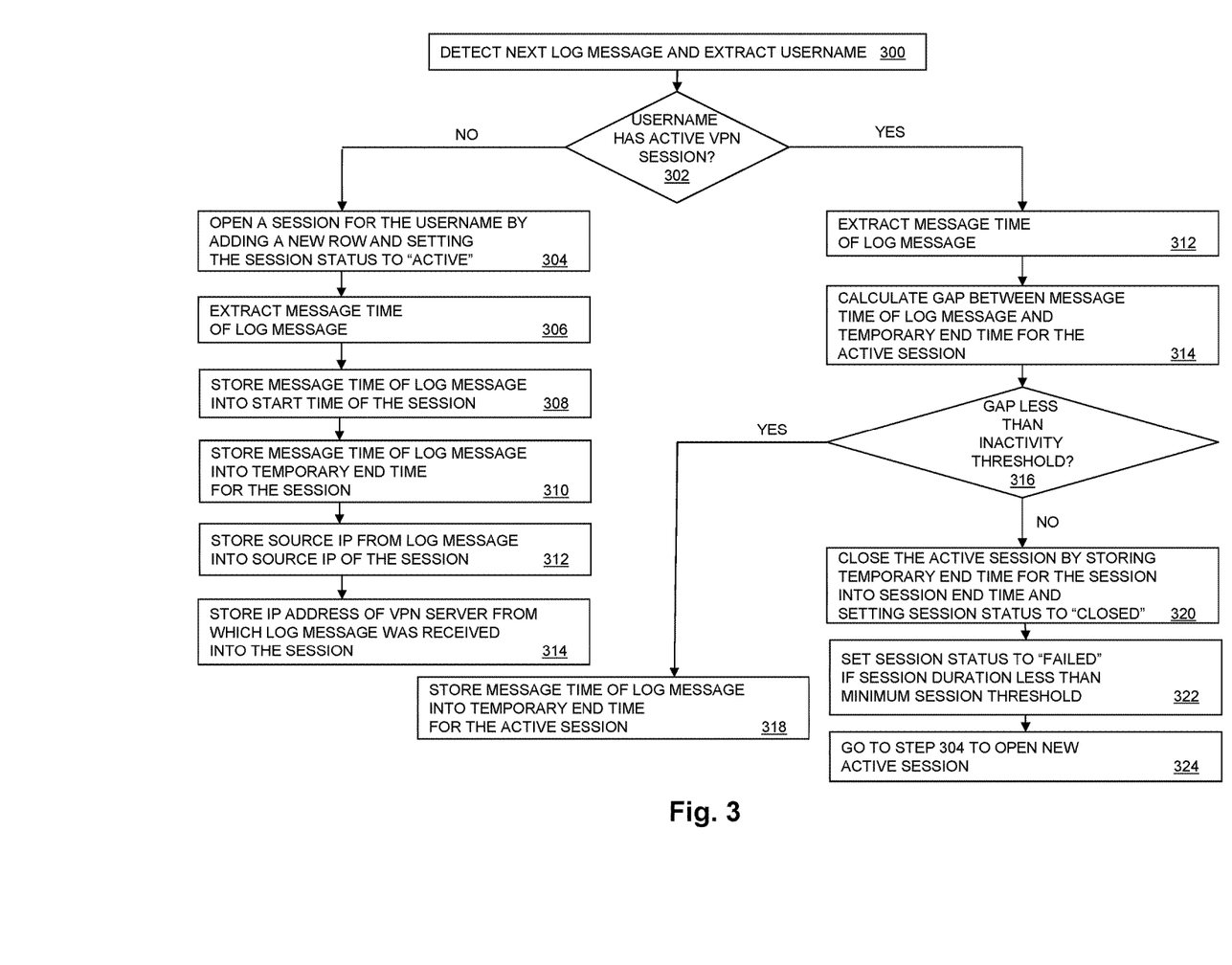
FIG. 3 is a flow chart showing an example of steps performed during operation of a an embodiment of the disclosed system to generate VPN sessions.

FIG. 3 is a flow chart showing an example of steps performed during operation of an embodiment of the disclosed system to generate VPN sessions. The steps of FIG. 3 may, for example, be performed by VPN Session Generation Logic 114 for each log message contained in VPN Server Log Messages 112. VPN Session Generation Logic 114 sequentially processes the log messages contained in VPN Server Log Messages 112 in the order of their message times. For example, the log messages contained in VPN Server Log Messages 112 may be stored in VPN Server Log Messages 112 in the order that they were originally generated by VPN Servers 180 and added to VPN Server Logs 182. VPN Session Generation Logic 114 processes the log messages contained in VPN Server Log Messages 112 in the order in which they are stored within VPN Server Log Messages 112, progressively processing individual log messages starting with the log message generated at the earliest message time through the most recently generated log message.

At step 300, a next log message is detected in VPN Server Log Messages 112, and the username is extracted from the log message. At 302, VPN Session Generation Logic 114 searches VPN Sessions Table 118 to determine whether VPN Sessions Table 118 currently includes a row containing the username extracted at step 300, and that also contains a current session status of ACTIVE. In response to determining at 302 that VPN Sessions Table 118 does not currently include a row containing the username extracted at step 300, and that also contains a current session status of ACTIVE, step 302 is followed by step 304. At step 304, VPN Session Generation Logic opens a session for the user corresponding to the username extracted from the log message by adding a new row to VPN Sessions Table 118. The current status of the new row added to VPN Sessions Table 118 at step 304 is set to ACTIVE.

Following step 304, at step 306, VPN Session Generation Logic 114 extracts the message time from the log message, and at step 308 stores the message time extracted from the log message into the start time of the row added to VPN Sessions Table 118 at step 304. At step 310 VPN Session Generation Logic 114 stores the message time extracted from the log message into a temporary end time corresponding to the row added at step 304, in Temporary End Times 115 (FIG. 1).

Following step 310, at step 312, VPN Session Generation Logic 114 extracts the source IP address from the log message and stores the extracted source IP address into the source IP address of the row added to VPN Sessions Table 118 at step 304.

At step 314, VPN Session Generation Logic 114 stores an IP address of the one of VPN Servers 180 that generated the log message into the VPN server IP address of the row added to VPN Sessions Table 118 at step 304.

In response to determining at step 302 that VPN Sessions Table 118 does include a row containing the username extracted at step 300, and that also contains a current session status of ACTIVE, step 302 is followed by step 312. At step 312, VPN Session Generation Logic 114 extracts the message time from the log message. At step 314, VPN Session Generation Logic 114 calculates a time gap between the message time extracted from the log message and the temporary end time in Temporary End Times 115 that corresponds to the row that contains the username extracted from the log message at step 300.

At step 316, VPN Session Generation Logic 114 compares the gap calculated at step 314 to an inactivity threshold time period (e.g. 30 minutes). If the gap calculated at step 314 is less than the inactivity threshold time period, then step 316 is followed by step 318. At step 318 the VPN Session Generation Logic 114 updates the temporary end time in Temporary End Times 115 that corresponds to the row that contains the username extracted from the log message at step 300. For example, at step 318, the VPN Session Generation Logic 114 stores the message time extracted from the log message at step 312 into the temporary end time in Temporary End Times 115 that corresponds to the row that contains the username extracted from the log message at step 300.

Otherwise, if the gap calculated at step 314 is not less than the inactivity threshold time period, then step 316 is followed by step 320. At step 320, VPN Session Generation Logic 114 closes the ACTIVE session represented by the row that contains the username extracted from the log message at step 300. Specifically, at step 300, VPN Session Generation Logic 114 stores the temporary end time in Temporary End Times 115 that corresponds to the row that contains the username extracted from the log message at step 300 into the end time contained in that row. Also at step 320, VPN Session Generation Logic 114 updates the current session status contained in the row that contains the username extracted from the log message at step 300 by setting the current session status contained in that row to CLOSED.

At step 322 VPN Session Generation Logic 114 calculates a session duration equal to the time between the start time and the end time contained in the row that contains the username extracted from the log message at step 300. If the session duration is less than a minimum session threshold time period (e.g. one minute), then VPN Session Generation Logic 114 sets the session status contained in the row that contains the user name extracted from the log message at step 300 to FAILED At step 324, VPN Session Generation Logic 114 opens a new session for the user associated with the username extracted from the log message at 300 by adding a new row to the VPN Session Table 118 by performing the steps 304 through 314.

Figure 4:
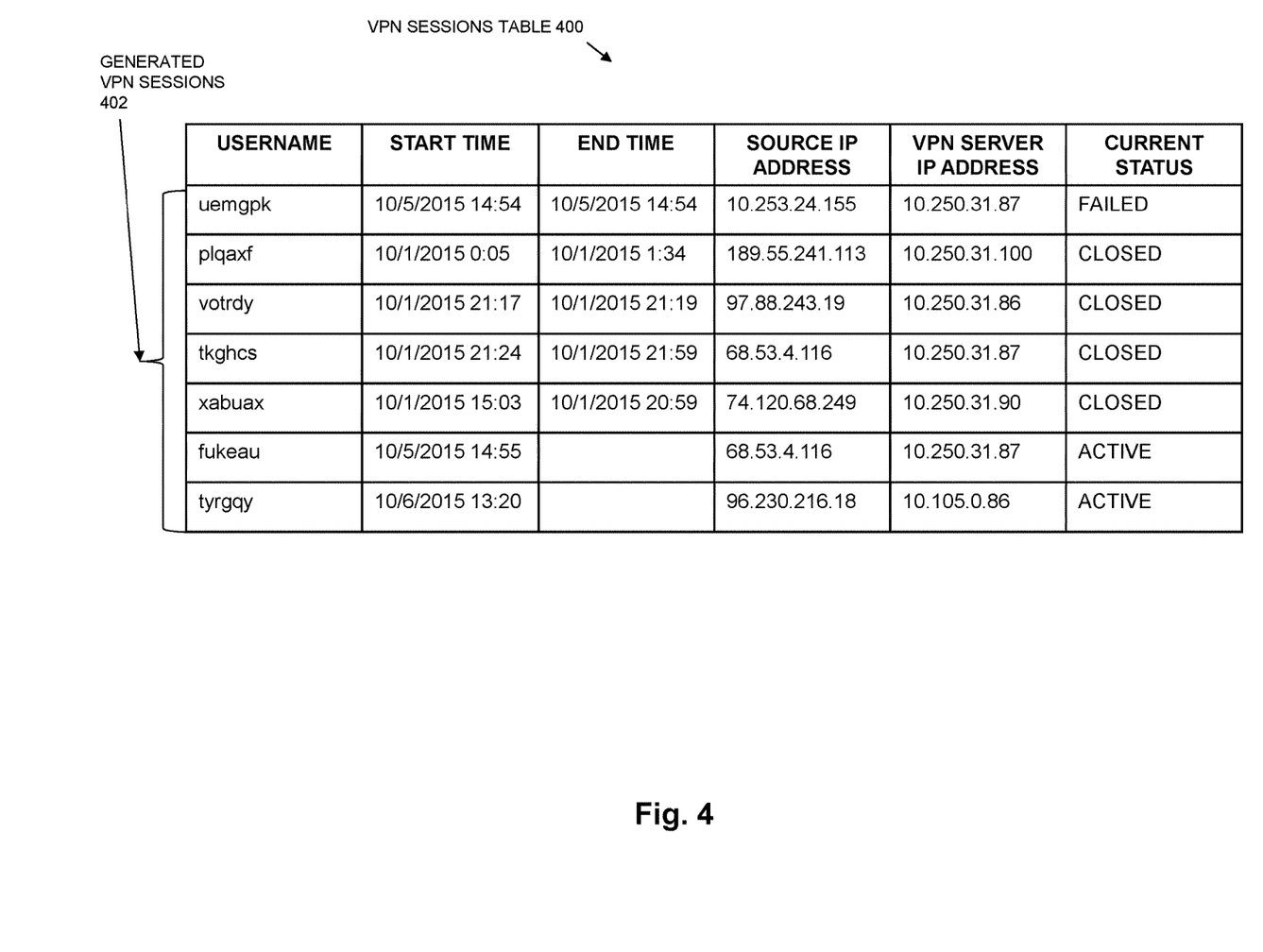
FIG. 4 is a block diagram showing an example of a VPN sessions table containing VPN sessions generated by the disclosed system and that may be displayed in a user interface.

FIG. 4 is a block diagram showing a VPN Sessions Table 400 that is an example of VPN Sessions Table 118 shown in FIG. 1. The rows in VPN Sessions Table 400 are VPN sessions generated by the disclosed system, and identified in FIG. 4 as VPN Sessions 402. VPN Sessions Table 400 may be displayed in a user interface, e.g. on the Display Device 108 as part of the Security Analysis Graphical User Interface 110 shown in FIG. 1.

The disclosed technology enables effective generation of VPN Sessions 402 in VPN Sessions Table 400 from raw data in log messages received from VPN servers. The VPN Sessions 402 generated using the disclosed techniques are more useful and understandable than the log messages from which they are generated, and are convenient for presentation to a user as part of the VPN Sessions Table 400, e.g. within a security analysis graphical user interface. The VPN session attributes displayed in VPN Sessions Table 400 for each one of VPN Sessions 402 are shown to include i) the username of the user who logged in to establish the VPN connection for the session (USERNAME), ii) a start time of the session (START TIME), iii) a current status of the session (CURRENT STATUS), equal to one of ACTIVE, CLOSED or FAILED, iii) an end time of the session (END TIME), iv) a source IP address that is the IP address of the user device that was used to establish the VPN connection for the session (SOURCE IP ADDRESS), and/or v) a VPN server IP address that is the IP address of the VPN server that was used to establish the VPN connection for the session (VPN SERVER IP ADDRESS) displayed in VPN Sessions Table 400 enable efficient identification of suspicious VPN sessions.

Those skilled in the art will recognize that various modifications may be made to the disclosed technology. For example, a more complex approach may include additionally applying text analysis methods such as sub-strings or regular expressions detection to extract the context of individual log messages (e.g., by detecting the substring "successful" to categorize successful authentication messages). These types of techniques represent a robust method to categorize messages that enables relying on message context for session generation without the burden of strongly coupling the technology to the specific message configuration.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied at least in part in one or more non-transitory computer readable storage medium(s) having computer readable program code stored thereon for causing one or more processors and/or a computer system to carry out those aspects of the present disclosure.

Any combination of one or more non-transitory computer readable storage medium(s) may be utilized. Examples of a non-transitory computer readable storage medium include, but are not limited to, an optical disc (e.g. CD or DVD), an optical storage device, a magnetic disk, a magnetic storage device, a random access memory (RAM), a read-only memory (ROM), an erasable programmable read-only memory (EPROM or Flash memory), and/or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method of generating virtual private network (VPN) sessions, comprising executing, on at least one processor, the steps of:

receiving log messages from one or more VPN servers, wherein each log message received from a respective one of the VPN servers is associated with a VPN connection provided by that VPN server;

processing the received log messages using a VPN sessions table having multiple rows, wherein each row in the VPN sessions table represents a corresponding VPN session and contains at least i) a username, ii) a session start time, and iii) a current status of the corresponding VPN session, at least in part by extracting a username and message time from each one of the received log messages and determining whether the VPN sessions table currently includes a row that contains both i) a username matching the username extracted from the log message, and ii) a current status of ACTIVE, and in response to determining for a first one of the received log messages that the VPN sessions table does not currently include a row that contains both i) a username matching the username extracted from the first one of the received log messages, and ii) a current status of ACTIVE, generating a new VPN session by adding a first new row to the VPN sessions table, wherein the first new row contains i) the username extracted from the first one of the received log messages, ii) a session start time equal to the message time extracted from the first one of the received log messages, and iii) a current status of ACTIVE, and setting a temporary end time corresponding to the first new row to the message time extracted from the first one of the received log messages, wherein the temporary end time corresponding to the first new row is stored within a set of temporary end times, wherein the set of temporary end times includes a temporary end time for each row in the VPN sessions table that contains a current status of ACTIVE; and displaying the VPN sessions table in a graphical user interface of a display device.

2. The method of claim 1, wherein processing the received log messages further comprises:
in response to determining for a second one of the received log messages that the VPN sessions table currently includes a row that contains both i) a username matching the username extracted from the second one of the received log messages, and ii) a current status of ACTIVE,
calculating a time gap between the message time extracted from the second one of the received log messages and the temporary end time corresponding to the row,
comparing the calculated time gap to an inactivity threshold, and
in response to the calculated time gap being less than the inactivity threshold, updating the temporary end time corresponding to the row to the message time extracted from the second one of the received log messages.

3. The method of claim 1, wherein each row in the VPN sessions table further contains a session end time, and wherein processing the received log messages further comprises:
in response to determining for a second one of the received log messages that the VPN sessions table currently includes a row that contains both i) a username matching the username extracted from the second one of the received log messages, and ii) a current status of ACTIVE,
calculating a time gap between the message time extracted from the second one of the received log messages and the temporary end time corresponding to the row,
comparing the calculated time gap to an inactivity threshold, and
in response to the calculated time gap being greater than or equal to the inactivity threshold, setting the session end time in the row to the temporary end time corresponding to the row, and updating the current status in the row to CLOSED.

4. The method of claim 3, wherein processing the received log messages further comprises:
further in response to the calculated time gap being greater than or equal to the inactivity threshold, generating a second new VPN session by
adding a second new row to the VPN sessions table, wherein the second new row contains i) the username extracted from the second one of the received log messages, ii) a session start time equal to the message time extracted from the second one of the received log messages, and iii) a current status of ACTIVE, and
setting a temporary end time corresponding to the second new row to the message time extracted from the second one of the received log messages, wherein the temporary end time corresponding to the second new row is stored within the set of temporary end times.

5. The method of claim 1, wherein each row in the VPN sessions table further contains a session end time, and wherein processing the received log messages further comprises:
in response to determining for a second one of the received log messages that the VPN sessions table currently includes a row that contains both i) a username matching the username extracted from the second one of the received log messages, and ii) a current status of ACTIVE,
calculating a time gap between the message time extracted from the second one of the received log messages and the temporary end time corresponding to the row,
comparing the time gap to an inactivity threshold, and
in response to the time gap being greater than or equal to the inactivity threshold,
setting the session end time in the row to the temporary end time corresponding to the row,
calculating a session duration equal to the time period between the session start time and session end time contained in the row,
comparing the session duration to a minimum session threshold, and
in response to the session duration being less than the minimum session threshold, setting the current status in the row to FAILED.

6. The method of claim 1, wherein each row in the VPN sessions table further contains a source IP (Internet Protocol) address, and wherein processing the received log messages further comprises:
extracting a source IP (Internet Protocol) address from the first one of the received log messages, wherein the source IP address is an IP address of a device used to establish a VPN connection associated with the first one of the received log messages; and
wherein the first new row added to the VPN sessions table further contains a source IP address equal to the IP address extracted from the first one of the received log messages.

7. The method of claim 6, wherein each row in the VPN sessions table further contains a VPN server IP address; and
wherein the first new row added to the VPN sessions table further contains a VPN server IP address equal to an IP address of the VPN server from which the first one of the received log messages was received.

8. A system for generating virtual private network (VPN) sessions, comprising:
processing circuitry; and
memory communicably coupled to the processing circuitry, the memory storing program code for generating VPN sessions, wherein the program code, when executed by the processing circuitry, causes the processing circuitry to:
receive log messages from one or more VPN servers, wherein each log message received from a respective one of the VPN servers is associated with a VPN connection provided by that VPN server;
process the received log messages using a VPN sessions table having multiple rows, wherein each row in the VPN sessions table represents a corresponding VPN session and contains at least i) a username, ii) a session start time, and iii) a current status of the corresponding VPN session, at least in part by
extracting a username and message time from each one of the received log messages and determining whether the VPN sessions table currently includes a row that contains both i) a username matching the username extracted from the log message, and ii) a current status of ACTIVE, and
in response to determining for a first one of the received log messages that the VPN sessions table does not currently include a row that contains both i) a username matching the username extracted from the first one of the received log messages, and ii) a current status of ACTIVE, generating a new VPN session by adding a first new row to the VPN sessions table, wherein the new row contains i) the username extracted from the first one of the received log messages, ii) a session start time equal to the message time extracted from the first one of the received log messages, and iii) a current status of ACTIVE, and setting a temporary end time corresponding to the first new row to the message time extracted from the first one of the received log messages, wherein the temporary end time corresponding to the first new row is stored within a set of temporary end times, wherein the set of temporary end times includes a temporary end time for each row in the VPN sessions table that contains a current status of ACTIVE; and display the VPN sessions table in a graphical user interface of a display device.

9. The system of claim 8, wherein the program code, when executed by the processing circuitry, further causes the processing circuitry to process the received log messages by:

in response to determining for a second one of the received log messages that the VPN sessions table currently includes a row that contains both i) a username matching the username extracted from the second one of the received log messages, and ii) a current status of ACTIVE, calculating a time gap between the message time extracted from the second one of the received log messages and the temporary end time corresponding to the row, comparing the calculated time gap to an inactivity threshold, and in response to the calculated time gap being less than the inactivity threshold, updating the temporary end time corresponding to the row to the message time extracted from the second one of the received log messages.

10. The system of claim 8, wherein each row in the VPN sessions table further contains a session end time, and wherein the program code, when executed by the processing circuitry, further causes the processing circuitry to process the received log messages by:

in response to determining for a second one of the received log messages that the VPN sessions table currently includes a row that contains both i) a username matching the username extracted from the second one of the received log messages, and ii) a current status of ACTIVE, calculating a time gap between the message time extracted from the second one of the received log messages and the temporary end time corresponding to the row, comparing the calculated time gap to an inactivity threshold, and in response to the calculated time gap being greater than or equal to the inactivity threshold, setting the session end time in the row to the temporary end time corresponding to the row, and updating the current status in the row to CLOSED.

11. The system of claim 10, wherein the program code, when executed by the processing circuitry, further causes the processing circuitry to process the received log messages by:

further in response to the calculated time gap being greater than or equal to the inactivity threshold, generating a new VPN session by adding a second new row to the VPN sessions table, wherein the second new row contains i) the username extracted from the second one of the received log messages, ii) a session start time equal to the message time extracted from the second one of the received log messages, and iii) a current status of ACTIVE, and setting a temporary end time corresponding to the second new row to the message time extracted from the second one of the received log messages, wherein the temporary end time corresponding to the second new row is stored within the set of temporary end times.

12. The system of claim 8, wherein each row in the VPN sessions table further contains a session end time, and wherein the program code, when executed by the processing circuitry, further causes the processing circuitry to process the received log messages by:

in response to determining for a second one of the received log messages that the VPN sessions table currently includes a row that contains both i) a username matching the username extracted from the second one of the received log messages, and ii) a current status of ACTIVE, calculating a time gap between the message time extracted from the second one of the received log messages and the temporary end time corresponding to the row, comparing the time gap to an inactivity threshold, and in response to the time gap being greater than or equal to the inactivity threshold, setting the session end time in the row to the temporary end time corresponding to the row, calculating a session duration equal to the time period between the session start time and session end time contained in the row, comparing the session duration to a minimum session threshold, and in response to the session duration being less than the minimum session threshold, setting the current status in the row to FAILED.

13. The system of claim 8, wherein each row in the VPN sessions table further contains a source IP (Internet Protocol) address, and wherein the program code, when executed by the processing circuitry, further causes the processing circuitry to process the received log messages by:

extracting a source IP (Internet Protocol) address from the first one of the received log messages, wherein the source IP address is an IP address of a device used to establish a VPN connection associated with the first one of the received log messages; and wherein the first new row added to the VPN sessions table further contains a source IP address equal to the IP address extracted from the first one of the received log messages.

14. The system of claim 13, wherein each row in the VPN sessions table further contains a VPN server IP address; and wherein the first new row added to the VPN sessions table further contains a VPN server IP address equal to an IP address of the VPN server from which the first one of the received log messages was received.

15. A computer program product including a non-transitory computer readable medium which stores program code operable to generate VPN sessions, the program code comprising:

program code for receiving log messages from one or more VPN servers, wherein each log message received from a respective one of the VPN servers is associated with a VPN connection provided by that VPN server;

program code for processing the received log messages using a VPN sessions table having multiple rows, wherein each row in the VPN sessions table represents a corresponding VPN session and contains at least i) a username, ii) a session start time, and iii) a current status of the corresponding VPN session, at least in part by         extracting a username and message time from each one of the received log messages and determining whether the VPN sessions table currently includes a row that contains both i) a username matching the username extracted from the log message, and ii) a current status of ACTIVE, and         in response to determining for a first one of the received log messages that the VPN sessions table does not currently include a row that contains both i) a username matching the username extracted from the first one of the received log messages, and ii) a current status of ACTIVE, generating a new VPN session by         adding a first new row to the VPN sessions table, wherein the first new row contains i) the username extracted from the first one of the received log messages, ii) a session start time equal to the message time extracted from the first one of the received log messages, and iii) a current status of ACTIVE, and         setting a temporary end time corresponding to the first new row to the message time extracted from the first one of the received log messages, wherein the temporary end time corresponding to the first new row is stored within a set of temporary end times, wherein the set of temporary end times includes a temporary end time for each row in the VPN sessions table that contains a current status of ACTIVE; and     displaying the VPN sessions table in a graphical user interface of a display device.

* * * * *